US012105462B2

(12) United States Patent
Matsushita et al.

(10) Patent No.: US 12,105,462 B2
(45) Date of Patent: Oct. 1, 2024

(54) IMAGE FORMING APPARATUS

(71) Applicant: CANON KABUSHIKI KAISHA, Tokyo (JP)

(72) Inventors: Shunsuke Matsushita, Kanagawa (JP); Taichi Sato, Kanagawa (JP); Nobuo Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 17/985,240

(22) Filed: Nov. 11, 2022

(65) Prior Publication Data

US 2023/0152746 A1 May 18, 2023

(30) Foreign Application Priority Data

Nov. 18, 2021 (JP) ................................ 2021-187882

(51) Int. Cl.
*G03G 21/06* (2006.01)
*G03G 15/00* (2006.01)
(Continued)

(52) U.S. Cl.
CPC ......... *G03G 21/06* (2013.01); *G03G 15/0233* (2013.01); *G03G 15/751* (2013.01); *G03G 21/0005* (2013.01); *G03G 21/0035* (2013.01); *G03G 21/007* (2013.01); *G03G 21/10* (2013.01); *G03G 21/1814* (2013.01); *G03G 21/1821* (2013.01); *G03G 2215/025* (2013.01); *G03G 2221/0015* (2013.01)

(58) Field of Classification Search
CPC ............. G03G 15/0233; G03G 15/751; G03G 21/0005; G03G 21/007; G03G 21/0035; G03G 21/06; G03G 21/10; G03G 21/1814; G03G 21/1821; G03G 2221/0015
See application file for complete search history.

(56) References Cited

U.S. PATENT DOCUMENTS 5,430,527 A * 7/1995 Maruyama ............ G03G 5/047 399/349
6,026,268 A * 2/2000 Shiozawa ........... G03G 15/161 399/302
7,539,451 B2 * 5/2009 Kawasumi ........... G03G 15/025 399/343

FOREIGN PATENT DOCUMENTS

JP 2003-302811 A 10/2003
JP 2005-114755 A 4/2005
(Continued)

*Primary Examiner* — Joseph S Wong
(74) *Attorney, Agent, or Firm* — Venable LLP

(57) ABSTRACT

An image forming apparatus includes a rotatable image bearing member about a rotational axis extending in the axial direction, a charging member, an accommodating portion accommodating toner charged to a predetermined polarity; a developing member, a transfer portion, a static eliminating portion, and a collecting member. In the axial direction, when A is a eliminating width with which the eliminating portion discharges the surface of the image bearing member, B is an effective charging width with which the charging member charges the surface, and C is a collection contacting width with which the collecting member contacts the surface, the formula A<B<C is satisfied. In the axial direction, a surface potential of the surface in an area outside the effective charging width, inside the collection contacting width and in contact with the collecting member is a first potential larger than 0V in the same polarity direction as the predetermined polarity.

12 Claims, 10 Drawing Sheets

(51) Int. Cl.

| | |
|---|---|
| ***G03G 15/02*** | (2006.01) |
| ***G03G 21/00*** | (2006.01) |
| ***G03G 21/10*** | (2006.01) |
| ***G03G 21/18*** | (2006.01) |

(56) References Cited

FOREIGN PATENT DOCUMENTS

| | | | |
|---|---|---|---|
| JP | 2007-279431 | A | 10/2007 |
| JP | 2010-008625 | A | 1/2010 |

* cited by examiner

IMAGE FORMING APPARATUS

FIELD OF THE INVENTION

This invention relates to an image forming apparatus forming an image on a sheet.

DESCRIPTION OF THE RELATED ART

The image forming apparatus such as a printer with an electrophotography process forms a toner image by developing an electrostatic latent image formed on a photosensitive drum with toner in a developing device. The toner image is transferred onto a sheet in a transferring portion. After transferring, deposited matter such as paper dust or filler generated by the sheet is sometimes deposited on the photosensitive drum.

Conventionally, the image forming apparatus providing a cleaning device removing the deposited matter and a remaining toner remained on the photosensitive drum described in Japan Laid-Open Application (JP-A) 2007-279431. The cleaning device includes a cleaning brush installed to be contact with a surface of the photosensitive drum. The cleaning brush removes the remaining toner on the photosensitive drum by applying a bias voltage with an opposite polarity to the polarity that the remaining toner has. Also, the cleaning brush removes the deposited matter on the photosensitive drum by scraping.

The cleaning brush described in JP-A2007-279431 holds a removed toner from the photosensitive drum for a while, therefore, the toner can scatter in the image forming apparatus in some cases.

SUMMARY OF THE INVENTION

Thus, the object of the present invention to provide the image forming apparatus reducing toner scattering.

According to an aspect of the present invention, there is provided an image forming apparatus comprising: a rotatable image bearing member about a rotational axis extending in the axial direction thereof; a charging member configured to form a charging portion between itself and the image bearing member and to charge a surface of the image bearing member; an accommodating portion configured to accommodate toner charged to a predetermined polarity; a developing member configured to form a developing portion between itself and the image bearing member and to form a toner image on the image bearing member by supplying the toner to the image developing portion; a transfer portion contacting the surface of the image bearing member and configured to transfer the toner image; a eliminating charge portion configured to eliminate charge on the surface of the image bearing member; and a collecting member configured to collect a deposited matter deposited on the surface of the image bearing member in contact with the surface of the image bearing member, wherein with respect to the axial direction, when A is defined as a eliminating charge width with which the eliminating portion is capable of eliminating the charge on the surface, B is defined as an effective charging width with which the charging member is capable of charging the surface, and C is defined as a collection contacting width with which the collecting member contacts the surface, the following formula is satisfied: $A<B<C$, and wherein with respect to the axial direction, a surface potential of the surface in an area outside the effective charging width, inside the collection contacting width and in contact with the collecting member is a first potential larger than 0V in the same polarity direction as the predetermined polarity.

Also, according to an aspect of the present invention, there is provided an image forming apparatus comprising: a rotatable image bearing member about a rotational axis extending in the axial direction thereof; a charging member configured to form a charging portion between itself and the image bearing member and to charge a surface of the image bearing member; an accommodating portion configured to accommodate toner charged to a predetermined polarity; a developing member configured to form a developing portion between itself and the image bearing member and to form a toner image on the image bearing member by supplying the toner to the image developing portion; a transfer portion contacting the surface of the image bearing member and configured to transfer the toner image; a collecting member configured to collect a deposited matter deposited on the surface of the image bearing member in contact with the surface of the image bearing member, and a cleaning member configured to remove the deposited matter in contact with the surface of the image bearing member, wherein with respect to the axial direction, when B is defined as an effective charging width with which the charging member is capable of charging the surface, C is defined as a collection contacting width with which the collecting member contacts the surface, and D is defined as a cleaning contacting width with which the cleaning member contacts the surface, the following formula is satisfied: $B<D<C$, and wherein with respect to the axial direction, a surface potential of the surface in an area outside the cleaning contacting width, inside the collection contacting width and in contact with the collecting member is a first potential larger than 0V in the same polarity direction as the predetermined polarity.

Furthermore, according to an aspect of the present invention, there is provided an image forming apparatus comprising: a rotatable image bearing member about a rotational axis extending in the axial direction thereof; a charging member configured to form a charging portion between itself and the image bearing member and to charge a surface of the image bearing member; an accommodating portion configured to accommodate toner charged to a predetermined polarity; a developing member configured to form a developing portion between itself and the image bearing member and to form a toner image on the image bearing member by supplying the toner to the image developing portion; a eliminating charge portion configured to eliminate charge on the surface of the image bearing member; a transfer portion contacting the surface of the image bearing member and configured to transfer the toner image; and a collecting member configured to collect a deposited matter deposited on the surface of the image bearing member in contact with the surface of the image bearing member, wherein with respect to the axial direction, when A is defined as a eliminating charge width with which the eliminating portion is capable of eliminating charge on the surface, B is defined as an effective charging width with which the charging member is capable of charging the surface, C is defined as a collection contacting width with which the collecting member contacts the surface, and E is defined as a width with which the surface of the developing member is cover by the toner, the following formula is satisfied: $E<A<B<C$, and wherein with respect to the axial direction, a surface potential of the surface in an area outside the effective charging width, inside the collection contacting width and in contact with the collecting member is a first potential larger than 0V in the same polarity direction as the predetermined polarity. Further features of the present invention will become apparent from the following description of exemplary embodiments with reference to the attached drawings.

DESCRIPTION OF THE EMBODIMENTS

In the following, embodiments of the present invention will be specifically described with reference to Figures. Note that, sizes, materials, shapes and relative positions of constitutional elements shown in the present embodiments are timely changed by a constitution or various conditions of an apparatus the present invention is applied and are not limited to the disclosed exemplary embodiments. Further, the image forming apparatus uses a recording sheet S including a various kind of sheet with different material such as a plain or a thick paper, a plastic film sheet used for an overhead projector, a special shaped sheet such as an envelope or an index sheet, and a cloth.

[Overall Constitution]

Figure 1:
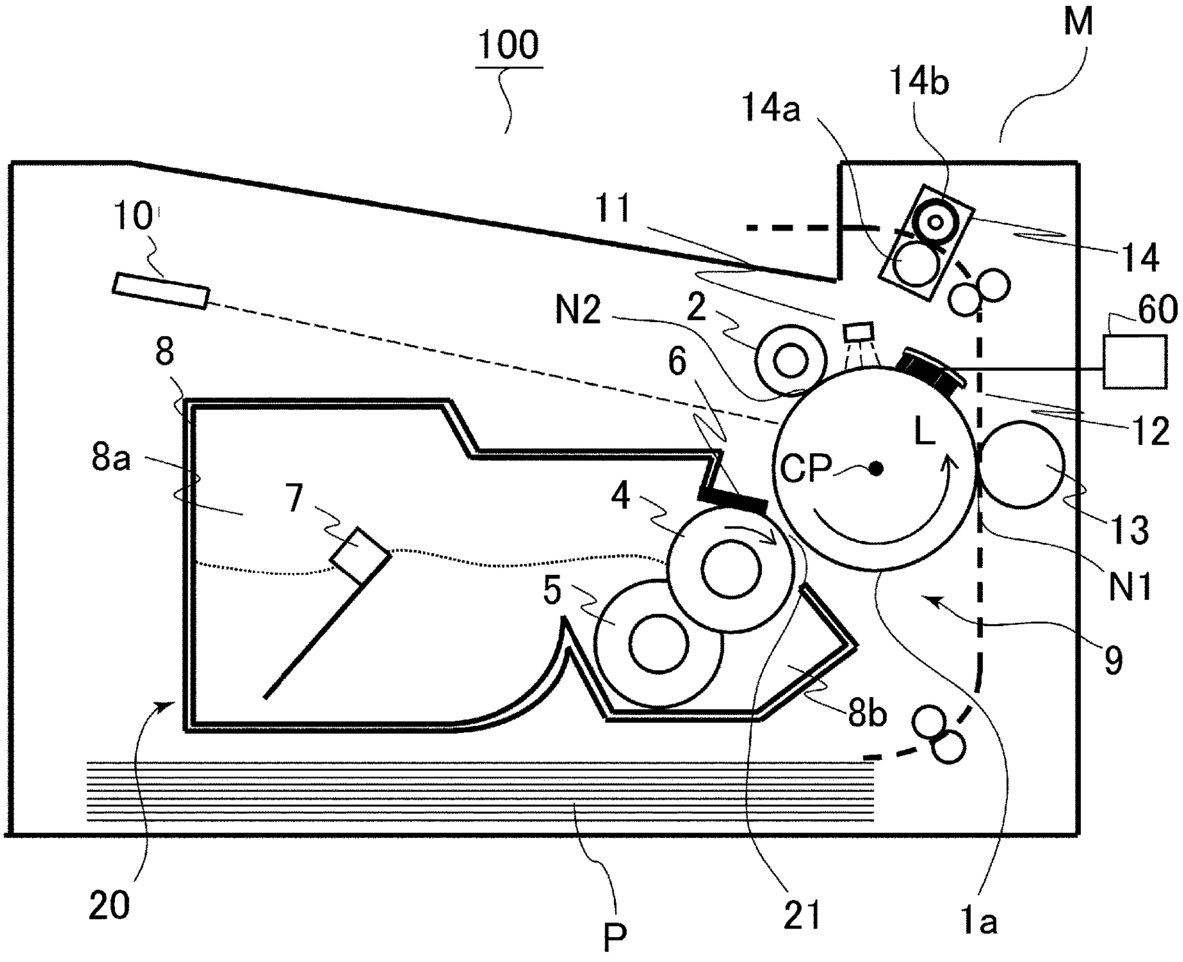
FIG. 1 is a drawing of an overview of the image forming apparatus relating to a first embodiment.

First off, the first embodiment of the present invention will be described. According to the first embodiment, an image forming apparatus 100 is a monochrome laser beam printer with electro-photographic method. In a main body M of the image forming apparatus 100 a process unit 9 with a direct transfer system is equipped as shown in FIG. 1. The process unit 9 includes a photosensitive drum 1, a charging roller 2 which is located surrounding the photosensitive drum 1, a developing unit 20, a eliminating charge device 11, and a brush member 12. Also, the main body M includes a scanner unit 10 emitting a laser light and forming an electrostatic latent image on the photosensitive drum 1 and a transfer roller 13 forming a transfer nip N1 in between the photosensitive drum 1 transfer a toner image on a recording sheet S in the transfer nip N1. The transfer roller 13 contacts on a surface 1*a* of the photosensitive drum 1 and transfers the toner image on the photosensitive drum 1 onto the recording sheet S by that the photosensitive drum 1 and the transfer roller 13 nip and feed the recording sheet S in the transfer nip N1.

Note that, in the present embodiment the process unit 9 is constituted as detachable from the main body M, however, it is not limited. For example, the process unit may be constituted as non-detachable from the main body M.

Figure 3:
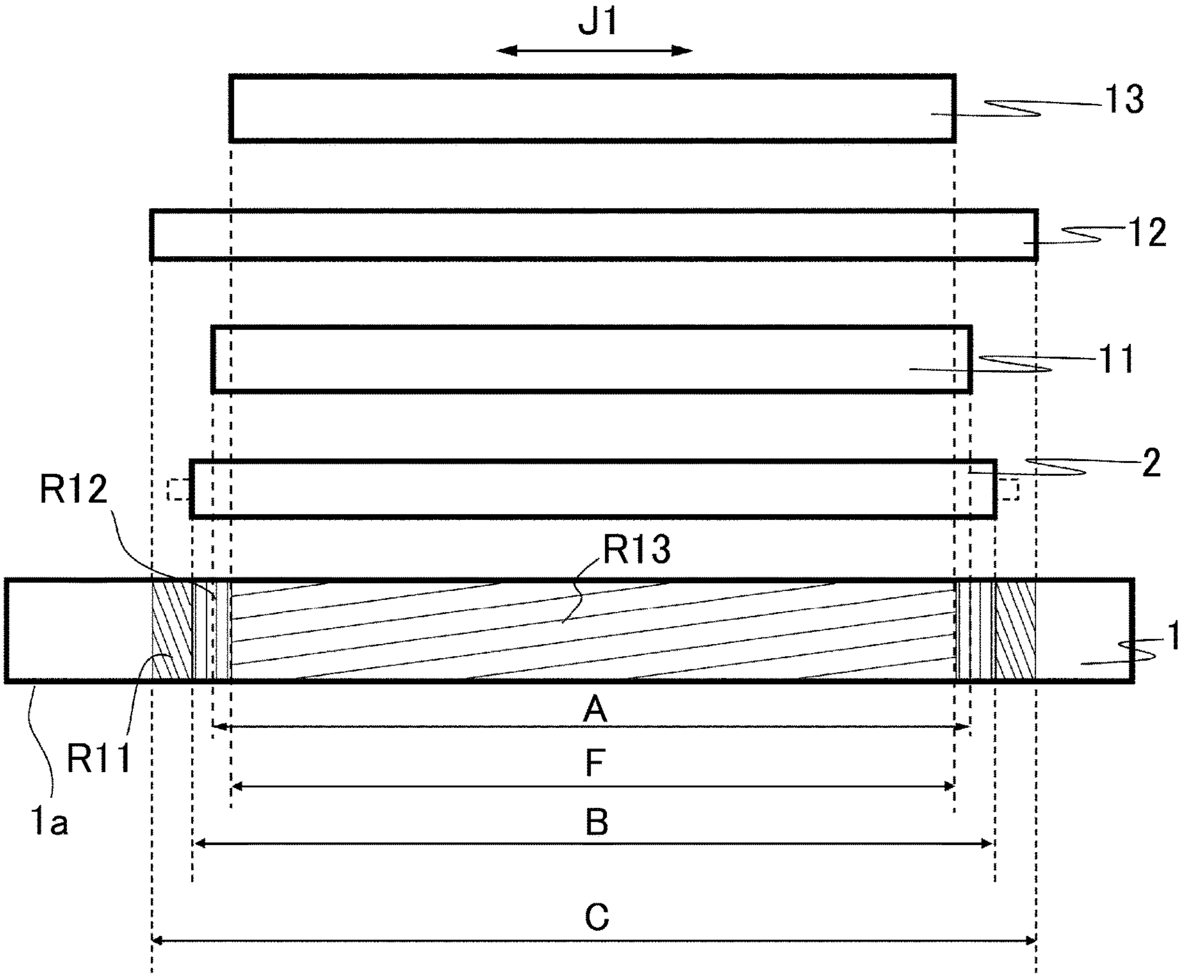
FIG. 3 is a drawing showing a contact width of a transfer roller, a eliminating charge width of a eliminating charge unit, an effective charging width of a charging roller, and a contact width of a cleaning brush member.

The photosensitive drum 1 as an image bearing member is a photosensitive member shaped in a cylinder shape and is rotatable with centering a rotational axis CP extending in an axial direction J1 (referred in FIG. 3). In the present embodiment, the photosensitive drum 1 includes a photosensitive layer formed with an organic photosensitive member with negative chargeability on a drum-shaped base body made of aluminum. In further detail, the photosensitive drum 1 is a rigid body structured by dip coating a peripheral surface of a 24 mm diameter aluminum cylinder with the following order, a resistant layer, an undercoating layer, and the photosensitive layer including a charge generating layer and a charge transporting layer. The charge transporting layer is 22 μm thick. The photosensitive drum 1 is driven to rotate centering the rotational axis CP in a direction of an arrow L by a driving motor at a predetermined rotating speed. The rotating speed of the photosensitive drum is referred as a process speed because the rotating speed of the photosensitive drum regulates the image forming speed in the image forming apparatus 100.

The charging roller 2 as a charging member contacts on the photosensitive drum 1 with a predetermined pressing force and forms a charging portion N2. Also, by applying a charging voltage which is a direct voltage from a charging voltage applying circuit (not showing in drawings) the surface 1*a* of the photosensitive drum 1 is evenly charged with a predetermined potential. In the present embodiment, the charging roller 2 applies −1400V of the charging voltage to set a surface potential (a potential before exposing VD) of the photosensitive drum 1 to be −800V. That is, the charging roller 2 charges the photosensitive drum 1 at the potential before exposing VD as a fourth potential in a negative polarity as same polarity of a toner. The charging roller 2 including a 6 mm diameter core metal, a base layer of a hydrin rubber, and a surface layer of urethane is constituted to be a 12 mm outside diameter. Also, a resistance of the charging roller 2 is less than $1\times10^{6}\Omega$ and the hardness of the charging roller 2 is 70 degrees with MD-1 rubber hardness meter. Note that, the charging voltage in the present embodiment is not limited to the direct voltage but may be a voltage superposing a direct voltage and an alternating voltage.

The scanner unit 10 scans and exposes the surface 1*a* of the photosensitive drum 1 by emitting a laser corresponding an image information input from an outer device on the photosensitive drum 1 using a polygonal mirror. This exposure forms an electrostatic latent image on the surface 1*a* of the photosensitive drum 1 corresponding the image information. The scanner unit 10 is a semi-conductor laser emitting an 800 nm wavelength laser and can change a light quantity. Note that, the scanner unit is not limited to a laser scanning device but may adopt an LED exposing device including an LED array lining several LEDs along a longitudinal direction of the photosensitive drum 1, for example.

The developing unit 20 comprises of a developing container 8 as a frame body of the developing unit 20, a developing roller 4, and a supplying roller 5 supplying a toner to the developing roller 4. Inside of the developing container 8 as an accommodating portion, a toner accommodating chamber 8*a* storing a toner (a developer) and a developing chamber 8*b* storing the developing roller 4 are formed. The developing roller 4 and the supplying roller 5 are rotatably held by the developing container 8. Also, developing roller 4 is located at an open portion of the developing container 8 to face the photosensitive drum 1. The supplying roller 5 is rotatably in contact with the developing roller 4 and the toner storing in the developing container 8 is applied on the surface 1*a* of the developing roller 4 by the supplying roller 5.

The developing unit 20 uses a contact developing method as a developing method, i.e. the toner image held by developing roller 4 is in contact with the photosensitive drum 1 in a developing portion 21 where the photosensitive drum 1 facing the developing roller 4. In other words, the developing roller 4 as the developing member forms the developing portion 21 in between the photosensitive drum 1. A developing voltage that is a direct voltage is applied on the developing roller 4 from a developing voltage applying portion (not showing). Under the developing voltage the electrostatic latent image is developed into the toner image by transferring the toner carried by developing roller 4 onto the surface 1*a* of the photosensitive drum 1 according to a potential distribution of the surface 1*a*. Note that, the present embodiment adopts a reflect developing method, i.e. in order to form the toner image, the toner is sticked on the surface area of the photosensitive drum 1 where is reduced its charging voltage by exposing in an exposing process after being charged in a charging process.

Also, the toner used in the present embodiment is a 6 μm particle size polymerized toner with a negative polarity as normal, for example. Further, the toner in the present embodiment does not include a magnetic component but a nonmagnetic single component developer carried with intermolecular force or electrostatic force (image force) mainly by the developing roller 4. Note that, the single component developer including a magnetic component may be used. The single component developer includes additives (for example, wax or silica particulate) to adjust mobility or charging ability of the toner in some cases beside the toner particles. Further, two components developer constituted with nonmagnetic toner and magnetic carrier may be used as the developer. When the developer with magnetic is used, cylindrical developing sleeve providing a magnet inside is used as the developer carrier, for example. Furthermore, the developing device 20 may be with non-contact developing method providing a predetermined gap in between the photosensitive drum 1.

The developing roller 4 is coated with a silicon rubber as a base layer and with a urethane rubber as an outer layer on a 6 mm core metal to be a 15 mm outer diameter. A resistance value of the developing roller 4 is between $1\times10^4$ and $1\times10^{12}\Omega$. The supplying roller 5 is a conductive elastic sponge roller made with a foam layer on a periphery of a 6 mm core metal. A resistance value of the supplying roller 5 is between $1\times10^4$ and $1\times10^{8\Omega}$ and a hardness is 200 gf. Note that, a value of the hardness of the supplying roller 5 is a load measured in a case when a 50 mm length flat board is pressed 1 mm down from a surface of the supplying roller 5.

In the developing container 8 an agitating member 7 is provided. The agitating member 7 rotates by the driving motor to agitate the toner in the developing container 8 and to convey the toner to the developing roller 4 and the supplying roller 5. Also, the agitating member 7 is assigned a task to circulate the toner which was not used in developing and scraped off the developing roller and to equalize in the developing container.

In an open portion of the developing container 8 where the developing roller 4 is located the developing blade 6 is provided to limit the quantity of the toner carried by the developing roller 4. The toner supplied on the surface of the developing roller 4 is evenly and thinly layered and charged with a negative polarity by frictional charging while passing through a portion the developing blade 6 facing the developing roller 4 by rotating of the developing roller 4.

The developing blade 6 is a 0.1 mm thick SUS metallic board. The developing blade 6 is located with respect to and in contact with the developing roller 4 as its free end to be on the side of downstream of the rotational direction of the developing roller 4. In the present embodiment the developing blade 6 is made with the SUS metallic board of which edge gets processed cutting from a contacting side with the developing roller 4. The edge of the developing blade 6 is bent along a direction of cutting by the processed cutting.

The transfer roller 13 as a transfer portion includes an ionic conductive sponge base layer covering on a 6 mm diameter core metal to be 15 mm outer diameter. The resistant value of the transfer roller 13 is $4\times10^7\Omega$ in 22 C.° temperature and its hardness is 30 degrees measured by Asker C hardness meter made by Asker Kobunshi Keiki Co., LTD.

When the image forming apparatus receives a command to form an image, the image forming process starts based on an image information input from an outer device such as a computer connected with the image forming apparatus 100. As the image forming process starting, the photosensitive drum 1 is driven by a power source (not showing in the figure) to rotate to the direction of an allow L at a predetermined speed in FIG. 1. According to the present embodiment a process speed of the photosensitive drum 1 is 140 rpm.

In the process unit 9 a eliminating charge unit 11 is provided to remove a static charge from the photosensitive drum 1 on downstream side of the transfer nip N1 and also on upstream side of the charging portion N2 with respect to the rotational direction (the arrow L direction) of the photosensitive drum 1. In detail further the eliminating charge unit 11 as the eliminating portion is located between the brushing member 12 and the charging roller 2 with respect to the rotational direction of the photosensitive drum 1. The eliminating charge unit 11 discharges the surface potential of the photosensitive drum 1 before reaching the charging portion N2 to generate stable discharge at the charging portion N2.

And then, the charging roller 2 charges the photosensitive drum 1 as rotating for its surface potential (a potential before pre-exposure VD) to be evenly −800V. The scanner unit 10 emits a laser onto the photosensitive drum 1 based on the image information input. Therefore, an electrostatic latent image is formed on the surface 1*a* of the photosensitive drum 1 charged evenly. In the present embodiment the scanner unit 10 emits a laser with 0.45 $\mu J/cm^2$ light quantity as a potential after exposure VL of the photosensitive drum 1 to be −100V.

At this time, a toner layer charged with designed polarity is formed on the surface of the developing roller 4. And then, by applying the developing charge to the developing roller 4 from a developing charge applying portion (not showing in the figures), the electrostatic latent image on the photosensitive drum 1 is developed at the developing portion 21 and the toner image is formed on the photosensitive drum 1. The developing charge in the present embodiment applied onto the developing roller 4 is −400V.

At the same time the image forming process described above, the recording sheet S stored in the bottom part of the image forming apparatus is fed. The recording sheet S is fed to the transfer nip N1 at a timing when the toner image formed on the photosensitive drum 1 reaches the transfer nip N1. Also, at a timing when the toner image formed on the photosensitive drum 1 reaches the transfer nip N1, a transfer charge which is a direct current is applied to the transfer roller 13 from a transfer charge applying circuit (not showing in the figures). Therefore, the toner image carried by the photosensitive drum 1 is transferred onto the recording sheet S which is passing the transfer nip N1. The transfer charge applied onto a transfer roller 13 in the present embodiment is +1500V.

The recording sheet S on which the toner image is transferred is fed to a fixing unit 14. The fixing unit 14 is a type of a heat fixing method which executes image fixing process by heating up and melt the toner on the recording sheet S. The fixing unit 14 includes a fixing film 14*a*, a fixing heater such as a ceramic heater heating up the fixing film 14*a*, and a pressing roller 14*b* pressing on the fixing film 14*a*. When the recording sheet S is passing a nipping portion between the fixing film 14*as* and the pressing roller 14*b*, the toner image is heated up and pressed. Therefore, the toner particle is melted and adhered, then the toner image is fixed on the recording sheet S. After passing through the fixing unit 14, the recording sheet S is discharged out of the image forming apparatus 100 by a pair of discharging rollers (not showing in the figures).

[Collecting a Transfer Remaining Toner]

A remaining toner of transferring which was not transferred onto the recording sheet S and left on the photosensitive drum 1 is removed by process described following. After transfer process, the surface potential of the photosensitive drum 1 is decreased as affected by the transfer voltage applied when the photosensitive drum 1 passes through the transfer nip N1. The surface potential of the photosensitive drum 1 after transfer process is −150V in the present embodiment. After the transfer process, the remaining potential of the photosensitive drum 1 is reduced to be by 0V with the eliminating charge unit 11 and the photosensitive drum 1 rotates toward the charging portion N2. The transfer remaining toner comprises of a mix of the toner charged with a positive polarity and the toner with a negative polarity which is not charged enough amount. The eliminating unit 11 reduces charge of the photosensitive drum 1 after transfer process and the transfer remaining toner is charged with negative polarity by the charging roller 2 discharging evenly. The transfer remaining toner charged with negative polarity again in the charging portion N2 reaches the developing portion 21 as the photosensitive drum 1 rotating. After passing the charging portion N2 the electrostatic latent image is formed by the scanner unit 10 exposing on the surface area of the photosensitive drum 1 keeping as the transfer remaining toner is sticking on.

Here, a movement of the transfer remaining toner reaching the developing portion 21 is described by each an exposing portion and a non-exposing portion of the photosensitive drum 1 separately. The transfer remaining toner sticking with the non-exposing portion of the photosensitive drum 1 is transferred to the developing roller 4 by a potential difference of a pre-exposing potential VD of the non-exposing portion of the photosensitive drum 1 and the developing charge in the developing portion 21, and then is collected into the developing container 8. Because the developing charge applying the developing roller 4 is relatively positive with respect to the pre-exposing potential VD of the non-exposing portion when a normal charging polarity of the toner is negative. Note that, the toner collected in the developing container 8 is mixed with the other toner in the developing container 8 and is spread by the mixing member 7 and then is repeatedly used for the developing process by carrying with the developing roller 4.

On the other hand, the transfer remaining toner sticking with the exposing portion of the photosensitive drum 1 does not transfer onto the developing roller 4 and stays on the surface of the drum. Because the developing charge applying the developing roller 4 is even more negative with respect to the pre-exposing potential VD of the exposing portion when a normal charging polarity of the toner is negative. The transfer remaining toner remaining on the surface 1*a* of the photosensitive drum is carried by the photosensitive drum 1 with other toner moving to the exposing portion from the developing roller 4, moved to the transfer nip N1, and transferred onto the recording sheet S in the transfer nip N1.

As described above, the process unit 9 is constituted as a cleaner-less which collects the transfer remaining toner in the developing unit 20 to reuse in the present embodiment. The cleaner-less structure of the process unit 9 makes possible for the image forming apparatus 100 to be more compact as a space to provide a collecting container collecting the transfer remaining toner is not necessary and possible to reduce a printing cost by reusing the transfer remaining toner as well.

[Brush Member]

Figure 2:
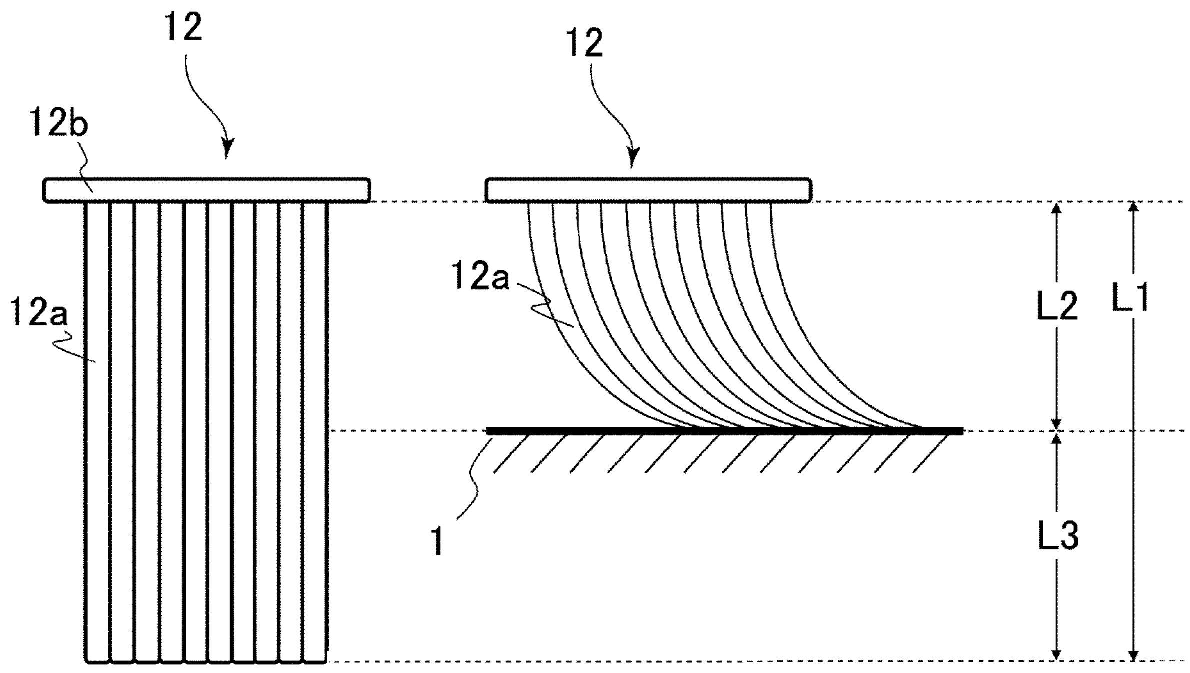
FIG. 2 is a drawing of a brush member.

As FIG. 1 and FIG. 2 showing, a brush member 12 locating on the downstream side from the transfer nip N1 and on the upstream side from the eliminating charge unit 11 with respect to the rotational direction (the direction of an arrow L) of the photosensitive drum 1 is provided in the process unit 9. The brush member 12 as a collecting member is located to be contact with the photosensitive drum 1 and removes adhered materials (hereinafter simply referred as a paper dust) from the photosensitive drum 1 by brushing the surface 1*a* of the photosensitive drum 1 as the photosensitive drum 1 rotates. The adhered materials as described above are materials such as a paper dust or fillers come out of the recording sheet S.

The brush member 12 includes a base cloth 12*b* having conductivity and a bunch of threads 12*a* made of conductive nylon. The bunch of threads 12*a* is woven into the base cloth 12*b*. When a density of the bunch of threads 12*a* is higher and/or an intrusion amount on the photosensitive drum 1 by the brush member 12 is greater, the passableness of the toner (including the transfer remaining toner) is decreased and the toner is piled up on the brush member 12. Therefore, the constitution of the brush member 12 should be selected as considered with the passableness of the toner and the ability of collecting paper dust.

Each thread of the bunch of threads 12*a* is 2 denier of fineness and the density of the threads is 170 $kF/inch^2$ in the present embodiment. The distance L1 from the base cloth 12*b* to the cutting edge of the threads 12*a* is 6.5 mm in the state with no force to bend the threads 12*a* from outside. Also, in the process unit 9 the brush member 12 is located as the edge of the threads 12*a* pressing down onto the photosensitive drum 1 by fixing the base cloth 12*b* to a holding member (not showing in the figures). In this case the distance L2 from the base cloth 12*b* to the photosensitive drum 1 is 5.5 mm. A difference L3 between the distance 1 and the distance 2 is defined as an intruding amount and the intruding amount L3 is 1.0 mm in the present embodiment.

The constitution as described above makes the brush member 12 be able to collect the paper dust while suppressing the toner to pile up on the brush member 12. However, a little amount of toner piling on the brush scatters from the end of the brush member 12 with respect to an axial direction J1 (referred in FIG. 3) and contaminates in the device in some cases in long term use. Therefore, a positional relation and an electric potential relation of parts of the brush member 12 in the axial direction J1 are configured to satisfy conditions described following in order to suppress the toner scattering from the end of the brush member 12 in the axial direction J1 in the present embodiment.

[Positional Relation in the Axial Direction of Each Component Part]

Next, each component part of the process unit 9; in detail, the positional relation of the photosensitive drum 1, the charging roller 2, the eliminating charge unit 11, the brush member 12, and the transfer roller 13 in the axial direction J1, will be described with FIG. 3. The charging roller 2, the transfer roller 13, the eliminating charge unit 11, and the brush member 12 are positioned symmetrically with respect to the center of the photosensitive drum 1 in the direction J1. FIG. 3 is a drawing showing a eliminating charge width A of the eliminating charge unit 11, an effective charging width B of the charging roller 2, a contact width C of the brush member 12, and a contact width F of the transfer roller 13. As FIG. 3 showing, the eliminating charge width A is a width the eliminating charge unit 11 can reduce charge from the surface 1*a* of the photosensitive drum 1 in the axial direction J1. The contact width F as a transfer contact width is a width the transfer roller 13 can be in contact with the surface 1*a* of the photosensitive drum 1 and can transfer the toner image formed on the photosensitive drum 1 in the axial direction J1. The effective charging width B is a width the charging roller 2 can charge on the surface 1*a* of the photosensitive drum 1 at the charging portion N2 in the axial direction J1. The contact width C as a collecting contact width the brush member 12 can be in contact with the surface 1*a* of the photosensitive drum 1 and can remove paper dust on the photosensitive drum 1.

The potential of the surface of the photosensitive drum 1 corresponding to the contact width F of the transfer roller 13 is affected in the opposite polarity direction by discharging and/or injecting charging from the transfer roller 13 as passing through the transfer nip N1. This is caused the transfer roller 13 is applied the transfer voltage which is the opposite polarity direction of the toner. As repeating this affection, the surface potential of the photosensitive drum 1 corresponding to the contact width F comes closer to the transfer voltage and charged with the opposite polarity of the toner. When the contact width F of the photosensitive drum 1 is contact with an end of the effective charging width B by the charging roller 2, a drum leak may occur as the discharging becomes active at the contact area. Therefore, the toner is developed as well as an image error is accidentally occurred on the area where the leak occurs. In order to prevent the drum leak, the contact width F is needed to be structured to be shorter than the effective charging width B of the charging roller 2 (F<B).

Also, a case that the charging roller 2 and the eliminating charge unit 11 are located as an end of the effective charging width B and an end of the eliminating charge width A of the eliminating charge unit 11 overlapping in the axial direction J1 is considered. In this case the discharging of the photosensitive drum becomes active at the end of the effective charging width B, the photosensitive drum 1 is accelerated to be consumed, and the drum leak may occur. Further, an area the transfer remaining toner remained is necessary to be removed charge. Thus, in the present embodiment the eliminating charge width A of the eliminating charge unit 11 is structured to be wider than the contact width F of the transfer roller 13 in the axial direction J1 and to be shorter than the effective charging width B of the charging roller 2 (F<A<B). In the other words, in the axial direction J1 the both ends of the eliminating charge unit 11 are located outside the both ends of the transfer roller 13 and inside of the both ends of the charging roller 2.

The contact width F of the transfer roller 13 is an area more paper dust and fillers are generated off the recording sheet S. Further, when the paper dust is sticked on the surface 1*a* of the photosensitive drum 1 in the effective charging width B of the charging roller 2, a spotted error image may be occurred since the area sticked with the paper dust is not charged enough by the charging roller 2. Thus, the contact width C is necessary to be structured to be wider than the effective charging width B as the paper dust to be properly removed from the surface 1*a* of the photosensitive drum 1 in the area of the effective charging width B (B<C).

As described above, a relation of the eliminating charge width A, the effective charging width B, and the contact width C is A<B<C. Note that, in the present embodiment the eliminating charge width A is 220 mm, the effective charging width B is 230 mm, and the contact width C is 240 mm, but they are not limited as far as the relation described above is satisfied.

As A<B<C is, i.e., F<A<B<C in detail, there are an area R11, an area R12, and an area R13 on the photosensitive drum 1. The area R11 is in contact with the brush member 12 but is not charged by the charging roller 2 or the transfer roller 13. In the other words, the area R11 is outside of the effective charging width B, inside of the contact width C in the axial direction J1, and also is where the brush member 12 is in contact with. The area R12 is in contact with the brush member 12 and charged by the charging roller 2 but is not in contact with the transfer roller 13. In the other words, the area R12 is outside of the contact width F, is inside of the effective charging width B in the axial direction J1, and also is where the brush member 12 is in contact with. The area R13 is in contact with the brush member 12 and charged by the charging roller 2 and the transfer roller 13. In the other words, the area 13 is inside of the contact width F in the axial direction J1 and is contact with the brush member 12 as well.

[The Surface Potential in an Area the Brush Member is in Contact With]

Figure 4:
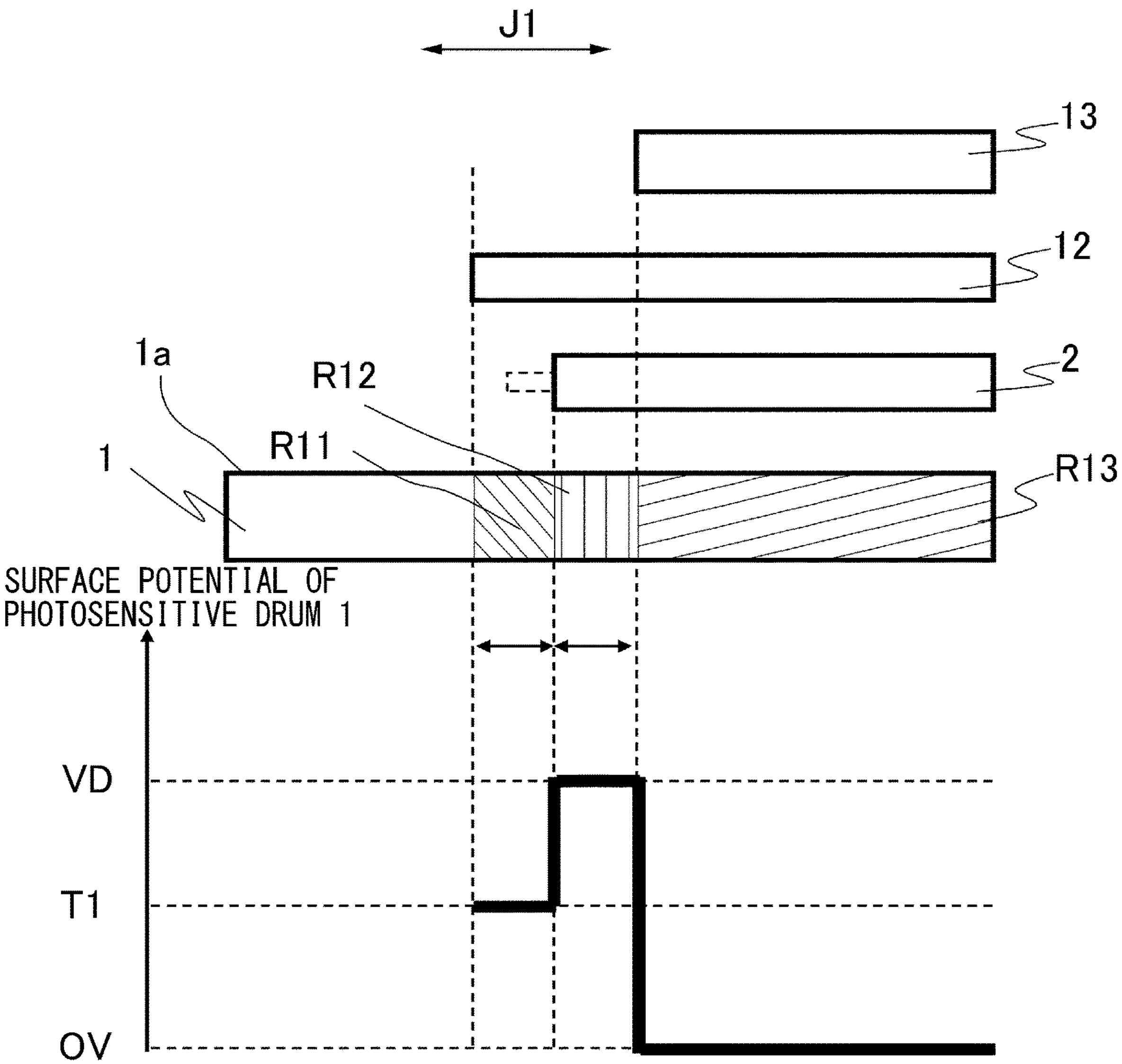
FIG. 4 is a drawing explaining a relation of a surface potential of the photosensitive drum in an area the brush member contacts.

Next, the surface potential of the photosensitive in an area the brush member 12 is in contact with will be described with FIG. 4. FIG. 4 is a drawing explaining a relation of the surface potential of the photosensitive drum in an area the brush member 12 is in contact with. The surface potential of the photosensitive drum 1 described following, unless stated otherwise, is the surface potential of the photosensitive drum 1 in the area the brush member 12 is in contact with.

As FIG. 4 showing, since the area R12 is inside of the effective charging width B and is outside of contact width F, the surface potential in the area R12 is close to the pre-exposing potential VD especially in the non-exposing portion. Also, in the area R11 the surface potential is 0V since the area R11 is not charged by the charging roller 2. Therefore, the toner piling up on the brush member 12 moves outward in the axial direction J1 i.e., the direction from the area R12 toward the area R11 as receiving a power of an electric field by a potential difference between the area R11 and the area R12. Thus, the toner piling up on the brush member 12 scatters in the image forming apparatus 100 from the end of the brush member 12 in the axial direction J1.

Therefore, in the present embodiment the surface potential of the area R11 is constituted to be greater than 0V with respect to the predetermined polarity direction in order to reduce the potential difference between the area R11 and the area R12. Note that, a normal polarity of the area R11 is negative as well as a normal polarity of the pre-exposing potential VD and the toner in the developing container 8.

In the present embodiment an injection charging is executed from the brush member 12 to the photosensitive drum 1 to make the surface potential of the area R11 become a value T1 as a first potential between 0V and the pre-exposing potential VD. That is, an absolute value of the value T1 is smaller than the pre-exposing potential VD. The brush member 12 is applied a brush charge which is a direct electric current from a brush charge applying circuit 60 (referred as FIG. 1) as a charge applying portion. In the present embodiment the brush charge is −400V as same polarity as the normal polarity of the toner. Therefore, the potential of the brush member 12 becomes high in the negative polarity direction as same polarity as the normal polarity of the toner. As a result, in the area R11 where the brush member 12 is in contact with the photosensitive drum 1 the injection charging is executed by the potential difference between the photosensitive drum 1 and the brush member 12, so that the surface potential of the area R11 becomes the value T1 (−400V) which is greater with respect to the negative polarity direction. Further, the surface potential of the area R12 is close to the pre-exposing potential VD as described above. Thus, the value T1 as the surface potential of the area R11 is smaller than the pre-exposing potential VD as a second potential which is the surface potential of the area R12.

Note that, the surface potential of the area R13 of the photosensitive drum 1 where the transfer roller 13 is in contact with is close to 0V in the exposing portion and −150V in the non-exposing portion as well affected by the transfer charge. In FIG. 4 showing the surface potential of the area R13 is about 0V as an example of the exposing portion. That is, the surface potential of the area R13 as a third potential is smaller in absolute value than the value T1 which is the surface potentials of the area R11, the area of the R12, or the pre-exposing potential VD.

Experiment 1

Here, an experiment using comparing examples will be described to show an effect of the present embodiment. In this experiment 1000 sheets of white image on a whole page are continuously printed in the environment with 50% humidity and 23° C. temperature to analyze whether toner scattering from the brush member 12 occurs.

The toner scattering is evaluated in 3 stages: no scattering (O), scattering a little (Δ), and scattering a lot (x), by seeing the state of the end of the brush member 12 in the axial direction J1 right after printing continuously. As an example to compare an effect of the present embodiment, constitutions of an comparing example 1-1 and an comparing example 1-2 showing in a table 1 are experimented and toner scattering are evaluated in 3 stages as well. The comparing example 1-1 is constituted of several setting of applying charge of the brush member 12 in a relation that the contact width F and the contact width C is F>C. Also, the comparing example 1-2 is constituted of several setting of applying charge of the brush member 12 with the opposite polarity (+ polarity) of the normal polarity of the toner in a relation that the contact width F and the contact width C is F>C. Each constitution and each result of the present embodiment 1, the comparing example 1-1, and the comparing example 1-2 are showing in the table 1.

TABLE 1

| | Relation of the contact width F and the contact width C | Brush charge | Toner Scattering |
|---|---|---|---|
| Embodiment 1 | F < C | −400 V | O |
| | | −300 V | O |
| | | −200 V | O |
| | | −100 V | O |
| Comparing example 1-1 | F > C | −400 V | Δ |
| | | −300 V | Δ |
| | | −200 V | Δ |
| | | −100 V | Δ |
| Comparing example 1-2 | F < C | 0 V | Δ |
| | | +100 V | × |
| | | +200 V | × |
| | | +300 V | × |
| | | +400 V | × |

When the contact width is contact with the end of the effective charging width B of the charging roller 2 in the constitution of the comparing example 1-1 where the relation of the contact width F and the contact width C is F>C, the drum leak may occur as the discharging becomes active at the contact area. Therefore, the toner is developed on an area the drum leak occurs and the image error is generated. Further, some amount of toner scatters from end of the brush member 12 in the axial direction J1.

Also, in the constitution of the comparing example 1-2, though the relation of the contact width F and the contact width C is F<C, the area R11 becomes the opposite polarity to the toner since the brush member 12 is applied with the opposite polarity charge of the toner. Thus, the potential difference between the area R11 and the area R12 becomes greater. Therefore, the toner scatters from end of the brush member 12 in the axial direction J1.

On the other hand, in the constitution of the present embodiment F<A<B<C is satisfied and the injection charging is executed to the area R11, so that the potential difference between the area R11 and the area R12 becomes smaller and toner scattering from end of the brush member 12 in the axial direction J1 is able to be suppressed.

Next, a second embodiment of the present invention will be described. In the second embodiment a positional relation of the photosensitive drum 1, the charging roller 2, the eliminating charge unit 11, the brush member 12, and the transfer roller 13 in the axial direction J1 is same with the first embodiment. On the other hand, the second embodiment is constituted as the surface potential (a value T2) of the area R11 is greater than the pre-exposing potential VD in the negative polarity direction. In the following, if the second embodiment includes same constitutions as the first embodiment, the constitutions of the second embodiment will be unillustrated or given the same reference numerals in the figure.

Figure 5:
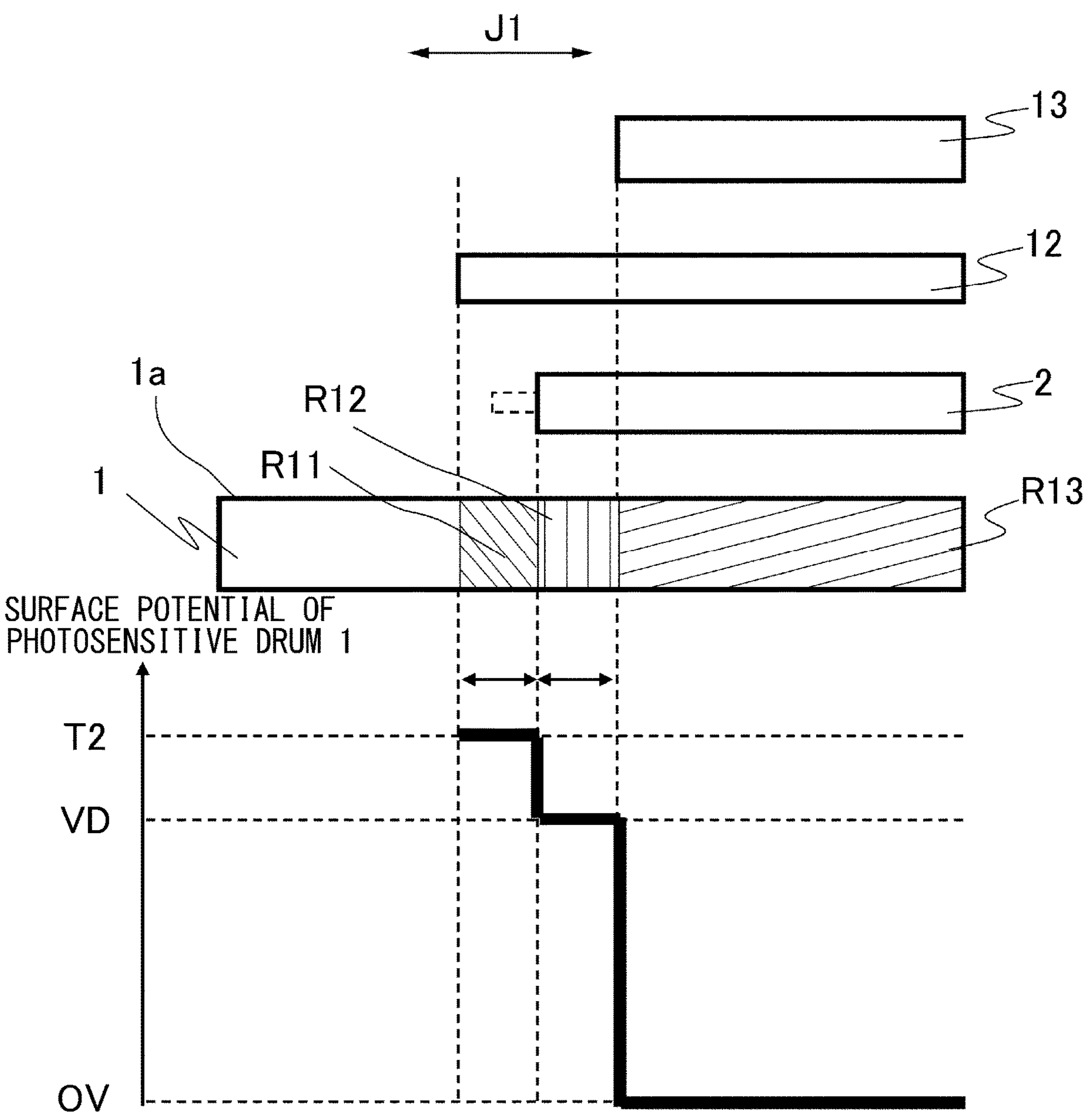
FIG. 5 is a drawing explaining a relation of a surface potential of the photosensitive drum in an area the brush member contacts in a second embodiment.

As shown in the FIG. 5, the brush member 12 is applied the brush charge that is a direct electric current from the brush charge applying circuit 60 (referred in the FIG. 1). The brush charge in the present embodiment is greater than the pre-exposing potential VD in the same polarity of the normal polarity of the toner i.e., in the negative polarity direction. In the present embodiment, by the injection charging from the brush member 12 to the photosensitive drum 1, the value T2 of the potential surface of the area R11 of the photosensitive drum 1 becomes greater than the pre-exposing potential VD. In the other words, the value T2 as the first potential is greater than the pre-exposing potential VD as the second potential which is the surface potential of the area R12.

Thus, the potential of the area R11 becomes greater than the area R12 in the same polarity direction of the toner, so that an electrical field which moves to the area R11 from the area R12 is generated. Since the toner is charged with a negative polarity in the present embodiment, the toner sticking on the photosensitive drum 1 receives a power from the electric field described above in the direction from the area R11 toward the area R12. Therefore, the toner scattering from the end of the brush member 12 in the axial direction J1 of the photosensitive drum 1 can be effectively suppressed.

Experiment 2

A same experiment made in the first embodiment is conducted in the present embodiment as well. Also, as an example to compare effectiveness of the present embodiment, the constitutions of the embodiment 1 and the comparing example 1-2 are experimented to evaluate toner scattering. The constitutions and experiment results of the embodiment 2, embodiment 1, and the comparing example 1-2 are showing in a table 2.

TABLE 2

| | Relation of the contact width F and the contact width C | Pre-exposing Potential VD | Brush charge | Toner Scattering |
|---|---|---|---|---|
| Embodiment 2 | F < C | −800 V | −1200 V | ◎ |
| | | | −900 V | ◎ |
| Embodiment 1 | F < C | −800 V | −600 V | O |
| | | | −300 V | O |
| Comparing example 1-2 | F < C | −800 V | 0 V | Δ |
| | | | +300 V | × |
| | | | +600 V | × |

As same as the result of the experiment 1, with the constitution of the comparing example 1-2 the toner scatters from the end of the brush member 12 in the axial direction J1 since the brush member 12 is applied with the opposite polarity charge of the toner. Also, in the embodiment 1 toner scattering can be suppressed since the brush member 12 is applied with a greater value of the brush charge than 0V in negative polarity direction which is an opposite polarity of the normal polarity of the toner. On the other hand, in the embodiment 2 the toner scattering can be suppressed more effective than the embodiment 1 since the brush charge with respect to negative polarity direction is greater than the pre-exposing potential VD so that a relation of VD<T2 is satisfied in an absolute value.

Next, a third embodiment will be described. The third embodiment is constituted of a cleaning member 15 in place of the eliminating charge unit 11 of the first embodiment. In the other words, the process unit 9 in the third embodiment is not a method of cleaner-less. In the following, if the third embodiment includes same constitutions as the first embodiment, the constitutions of the third embodiment will be unillustrated or given the same reference numerals in the figure.

[Cleaning Member]

Figure 7:
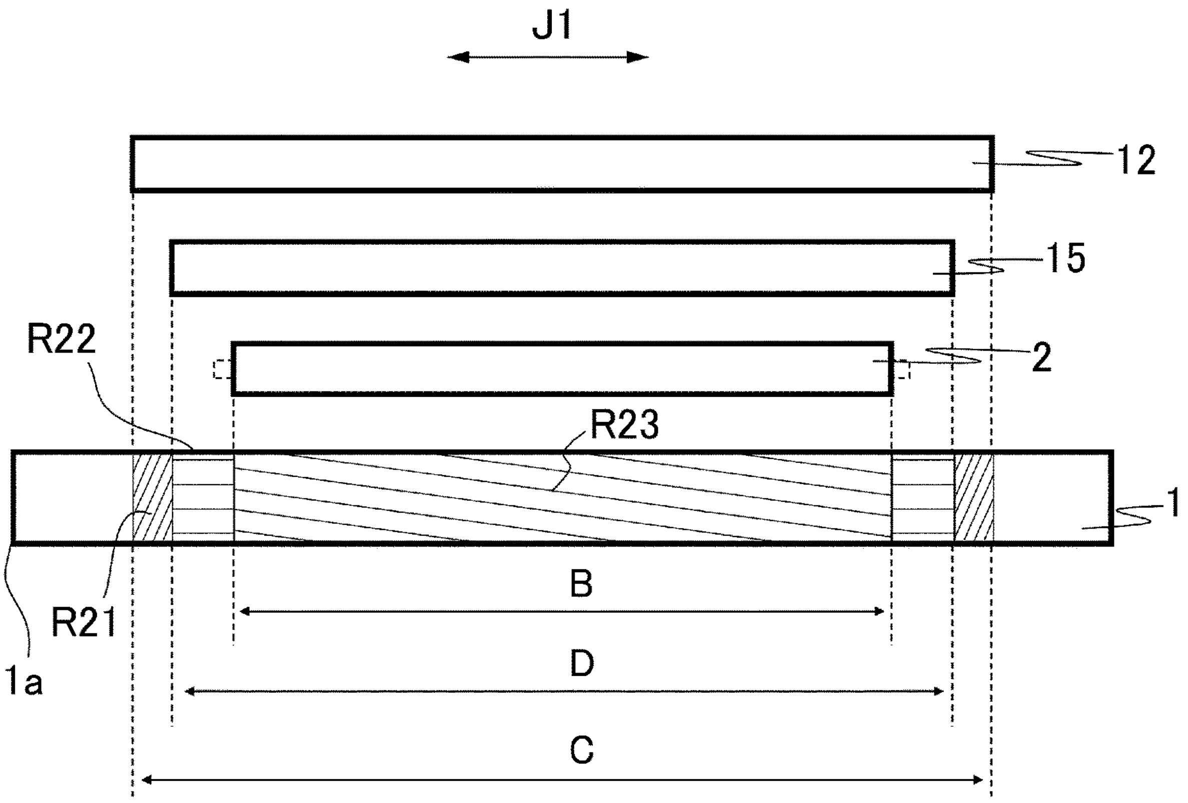
FIG. 7 is a drawing showing the effective charging width of the charging roller, the contact width of the brush member, and a contact width of the cleaning member.

As FIG. 1 and FIG. 7 showing, the cleaning member 15 locating downstream side from the transfer nip N1 and upstream side of the brush member 12 in the rotational direction (direction of the arrow L) of the photosensitive drum 1 removes an adhered material (including the transfer remaining toner and paper dust) on the surface 1*a* of the photosensitive drum 1. In the present embodiment the cleaning member 15 and the brush member 12 are combined to remove the adhered material (hereinafter simply referred as paper dust) that the cleaning member 15 could not perfectly remove.

Figure 6:
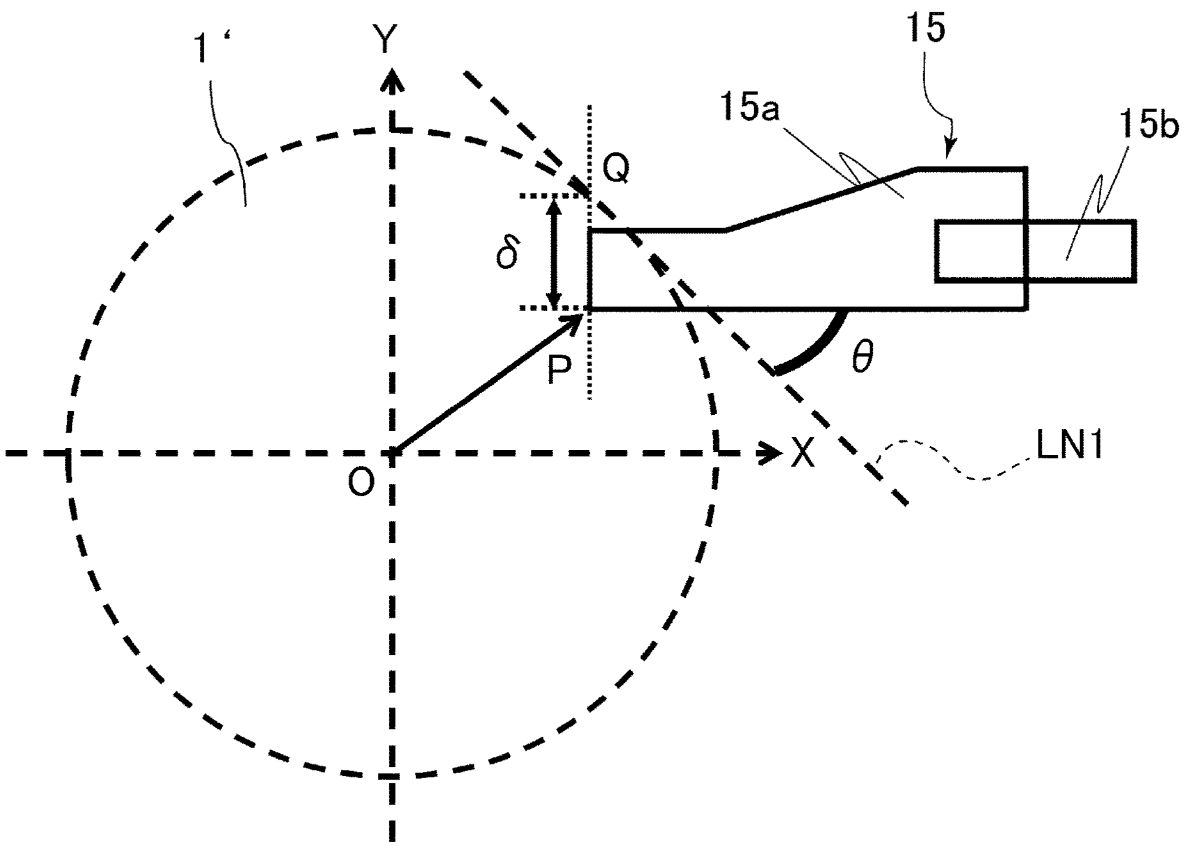
FIG. 6 is a drawing of a cleaning member in a third embodiment.

As FIG. 6 showing, the cleaning member 15 includes a sheet metal 15*b* made of metal material and an elastic member 15*a* fixed on the sheet metal 15*b*, the elastic member 15*a* remove the transfer remaining toner and paper dust by scraping on the surface 1*a* of the rotating photosensitive drum 1. In the present embodiment the elastic member 15*a* is made of 2 mm thick urethane rubber having from 60 to 80 degree of MD-1 hardness in 23° C. environment.

In FIG. 6 a virtual photosensitive drum 1' which is a same shape as the photosensitive drum 1 is indicated with a broken line and a center of the virtual photosensitive drum 1' is referred as a center O. The closest point of the elastic member 15*a* to the center O is referred as a point P and a crossing point of a line extending to a vertical direction passing through the point P and the virtual photosensitive drum 1' is referred as a point Q. A distance between the point P and the point Q is an intrusion amount δ. Further, when a tangential line of the virtual photosensitive drum 1' on the point Q is referred as a tangential line LN1, an angle made by the tangential line LN1 and a bottom side of the elastic member 15*a* is referred as a setting angle θ. Note that, the intrusion amount is 1.0 mm and the setting angle is 22° in the present embodiment.

[Positional Relation of Each Component Parts in the Axial Direction]

Next, positional relation in the axial direction J1 of each component parts of the process unit 9: in detail, the photosensitive drum 1, the charging roller 2, the brush member 12, and the cleaning member 15 will be described with FIG. 7. The charging roller 2, the brush member 12, and the cleaning member 15 are symmetrically located with respect to the center of the photosensitive drum 1 in the axial direction J1. FIG. 7 is a drawing showing the effective charging width B of the charging roller 2, the contact width C of the brush member 12, and a contact width D as a cleaning contact width of the cleaning member 15. As FIG. 7 showing, the contact width D is the width being able to remove the transfer remaining toner and paper dust on the photosensitive drum 1 by contacting on the surface 1*a* of the photosensitive drum 1.

The contact width D is necessary to be configured to be bigger than the effective charging width B to remove adequately the transfer remaining toner and paper dust in the area of the effective charging width B on the surface 1*a* of the photosensitive drum 1 (B<D).

Here, when the relation of the contact width C of the brush member 12 and the contact width D of the cleaning member 15 is D<C, the toner scattering occurs from the end of the brush member 12 as well as the embodiment 1. Therefore, it is necessary to includes an electric potential relation described following in the case of the effective charging width B, the contact width C, and D including the relation of B<D<C.

When B<D<C is related, there are an area R21, R22, and R23 on the photosensitive drum 1. The area 21 is the area where the brush member 12 is in contact with but is not charged by the charging roller 2 and is not in contact with the cleaning member 15. In the other words, the area R21 is outside of the contact width D, inside of the contact width C in the axial direction J1, and the brush member 12 is in contact with. The area R22 is the area where the brush member 12 and the cleaning member 15 is in contact with but is not charged by the charging roller 2. In the other words, the area R22 is outside of the effective charging width B, inside of the contact width D in the axial direction J1, and also the brush member 12 is in contact with. The area R23 is the area where the brush member 12 and the cleaning member 15 are in contact with and is charged by the charging roller 2.

[Surface Potential of the Photosensitive Drum in the Area the Brush Member Contacting]

Figure 8:
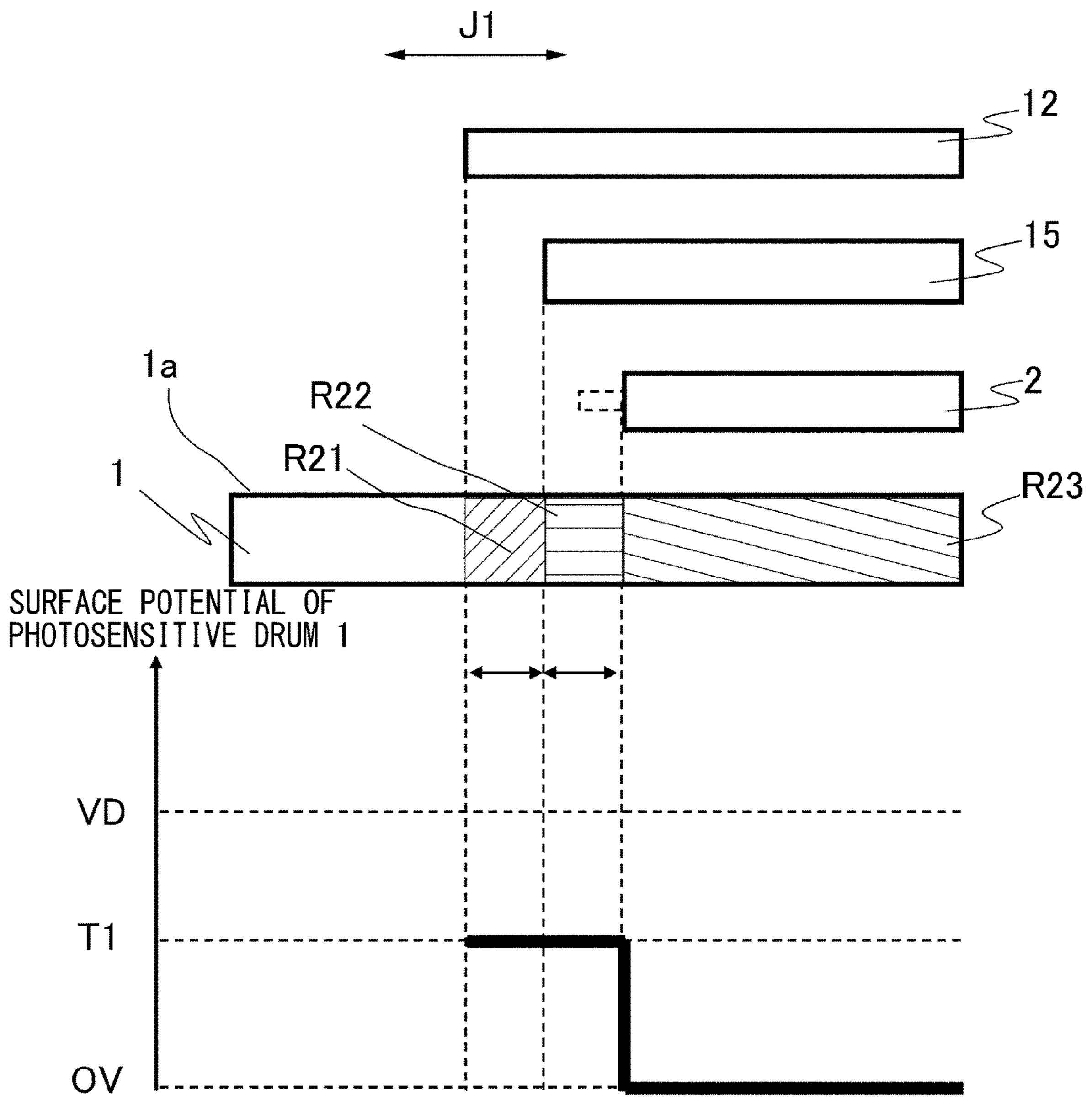
FIG. 8 is a drawing explaining a relation of a surface potential of the photosensitive drum in an area the brush member contacts.

Next, the surface potential of the photosensitive drum 1 in the area the brush member 12 is in contact with will be described with FIG. 8. FIG. 8 is a drawing explaining a relation of the surface potential of the photosensitive drum 1 in the area the brush member 12 contacts. The surface potential of the photosensitive drum 1 described following is the surface potential of the photosensitive drum 1 in the are the brush member 12 is in contact with, unless stated otherwise.

As FIG. 8 showing, since the area R21 and R22 are located outside of the effective charging width B, the surface potential is 0V without being charged by the charging roller 2. On the other hand, the area R23 is close to 0V in the exposing portion and is −150V in the non-exposing portion with being affected by the transfer charge. In FIG. 8 the surface potential of the area R23 is about 0V showing as an example in the exposing portion.

Here, since the area R22 is where the cleaning member 15 is in contact with, an amount of the transfer remaining toner or paper dust piling on the brush member 12 is less in an area corresponding to the area R22. On the other hand, since the area R21 is where the cleaning member 15 is not in contact with, an amount of the transfer remaining toner or paper dust piling on the brush member 12 is a lot in an area corresponding to the area R21. Especially, the toner piling on the brush member 12 in the area R21 moves outward in an axial direction J1: i.e., in the direction from the area R23 toward the area R21 as receiving a power of an electric field by a potential difference between the area R21 and the area R23. Therefore, the toner piling on the brush member 12 scatters from an end in the axial direction J1 to inside of the image forming apparatus 100.

Thus, the surface potential of the area R21 is configured to be greater than 0V with respect to a predetermined polarity direction at least to minimize a potential difference between the area R21 and R23 in the present embodiment. Note that, a normal polarity of the area R21 is negative as well as the normal polarity of the pre-exposing potential VD and the toner in the developing container 8.

Also, the surface potential of the area R22 is configured to be greater than 0V with respect to a predetermined polarity direction at least to minimize a potential difference between the area R22 and R23 in the present embodiment. Note that, a normal polarity of the area R22 is negative as well as the normal polarity of the pre-exposing potential VD and the toner in the developing container 8.

In the present embodiment an injection charging is executed from the brush member 12 to the photosensitive drum 1 for the surface potential of the area R21 and R22 to be a value T1 as a first potential and as a second potential in between 0V and the pre-exposing potential VD as well as the first embodiment. Note that, the surface potential of the area R22 is not necessary to be the same with the value of the surface potential of the area R21.

The brush member 12 is applied with the brush charge which is a direct current from the brush charge applying circuit 60 (showing in FIG. 1). The brush charge in the present embodiment is −400V which is the same polarity as the normal polarity of the toner. Therefore, the potential of the brush member 12 becomes high in the negative polarity direction as same as the normal polarity of the toner. As a result, the injection charging by the potential difference between the photosensitive drum 1 and the brush member 12 for the surface potential of the area R21 and R22 to become the value T1 (−400V) which is greater in the negative polarity direction in the area R21 and R22 of the photosensitive drum 1 where the brush member 12 contacting on.

Experiment 3

In the present embodiment an experiment is conducted as same as the experiment made in the embodiment 1. Also, as an example to compare effectiveness of the present embodiment, the constitution of the comparing example 2 showing in a table 3 is experimented to evaluate toner scattering. The comparing example 2 is constituted of several settings of the applying charge of the brush member 12 with the opposite polarity. The constitutions and experiment results of the embodiment 3 and the comparing example 2 are showing in the table 3.

TABLE 3

| | Brush charge | Toner scattering |
|---|---|---|
| Embodiment 3 | −400 V | O |
| | −300 V | O |
| | −200 V | O |
| | −100 V | O |
| Comparing example 2 | 0 V | Δ |
| | +100 V | × |
| | +200 V | × |
| | +300 V | × |
| | +400 V | × |

In the constitution of the comparing example 2 the area R21 and R22 become the same polarity potential with the toner since the brush member 12 is applied with an opposite polarity charge of the toner. Therefore, the potential difference between the area R21 and the area R23 become greater. As a result, the toner scatters from the end of the brush member in the axial direction J1.

On the other hand, in the constitution of the present embodiment the potential difference between the area R21 and the area R23 becomes less with satisfying B<D<C and the injection charging to the area R21. Therefore, the toner scattering from the end of the brush member 12 in the axial direction J1 can be suppressed.

Next, a fourth embodiment of the present invention will be described. The fourth embodiment is an altered the width of the developing roller 4 of the first embodiment. In other words, a process unit 9 of the fourth embodiment is a cleaner-less method as same as the first embodiment. In the following, if the fourth embodiment includes same constitutions as the first embodiment, the constitutions of the fourth embodiment will be unillustrated or given the same reference numerals in the figure.

[Positional Relation of Each Component Part in the Axial Direction]

Figure 9:
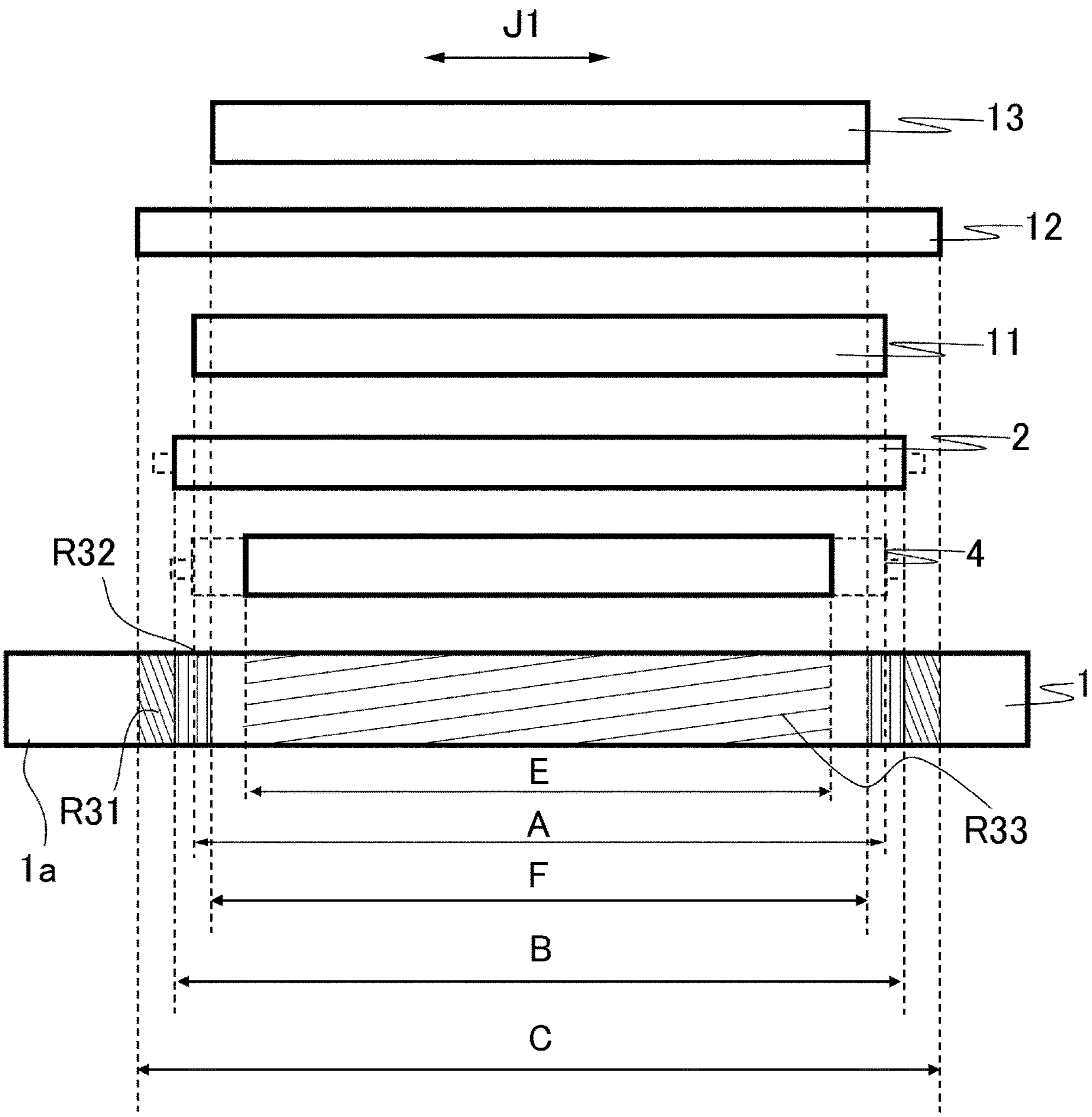
FIG. 9 is a drawing showing the contact width of the transfer roller, the eliminating charge width of the eliminating charge unit, the effective charging width of the charging roller, the contact width of the cleaning brush member, and a toner coating width of a developing roller.

A positional relation in the axial direction J1 of each component parts of the process unit 9: in detail, the photosensitive drum 1, the charging roller 2, the developing roller 4, the eliminating charge unit 11, the brush member 12, and the transfer roller 13 will be described with FIG. 9. The charging roller 2, the developing roller 4, the transfer roller 13, the eliminating charge unit 11, and the brush member 12 are symmetrically located in the axial direction J1 with respect to the center of the photosensitive drum 1. FIG. 9 is a drawing showing the eliminating charge width A of the eliminating charge unit 11, the effective charging width B of the charging roller 2, the contact width C of the brush member 12, a toner coating width E of the developing roller 4, and the contact width F of the transfer roller 13. As FIG. 9 showing, the toner coating width E is a width of an area of the surface of the developing roller 4 where is covered with a toner being supplied by the supplying roller 5. The contact width F where the toner is transferred onto by the transfer roller 13 is necessary to be greater than the toner coating width E in order to transfer a toner image on the photosensitive drum 1 certainly ($E<F$).

Here, when the relation of the contact width C of the brush member 12 and the toner coating width E of the developing roller 4 is $E<C$, the toner scattering from the end of the brush member 12 occurs as well as the embodiment 1. Therefore, it is necessary to include an electric potential relation described following in the case of the eliminating charge width A, the effective charging width B, the contact width C, and F, and the toner coating width E including the relation of $E<F<A<B<C$.

When $E<F<A<B<C$ is related, there are an area R31, R32, and R33 on the photosensitive drum 1. The area 31 is the area where the brush member 12 is in contact with but is not charged by the charging roller 2 or the transfer roller 13 and is not in contact with a toner coating area (corresponding to the toner coating width E) of the developing roller 4. In the other words, the area R31 is outside of the effective charging width B, inside of the contact width C in the axial direction J1, and the brush member 12 is in contact with. The area R32 is the area where the brush member 12 is in contact with and is charged by the charging roller 2, but is not in contact with the transfer roller 13 and is not in contact with the toner coating area of the developing roller 4. The area R33 is the area where the brush member 12 is in contact with, charged by the charging roller 2 and is in contact with the transfer roller 13 and the toner coating area of the developing roller 4.

[Surface Potential of the Photosensitive Drum in the Area the Brush Member Contacting]

Figure 10:
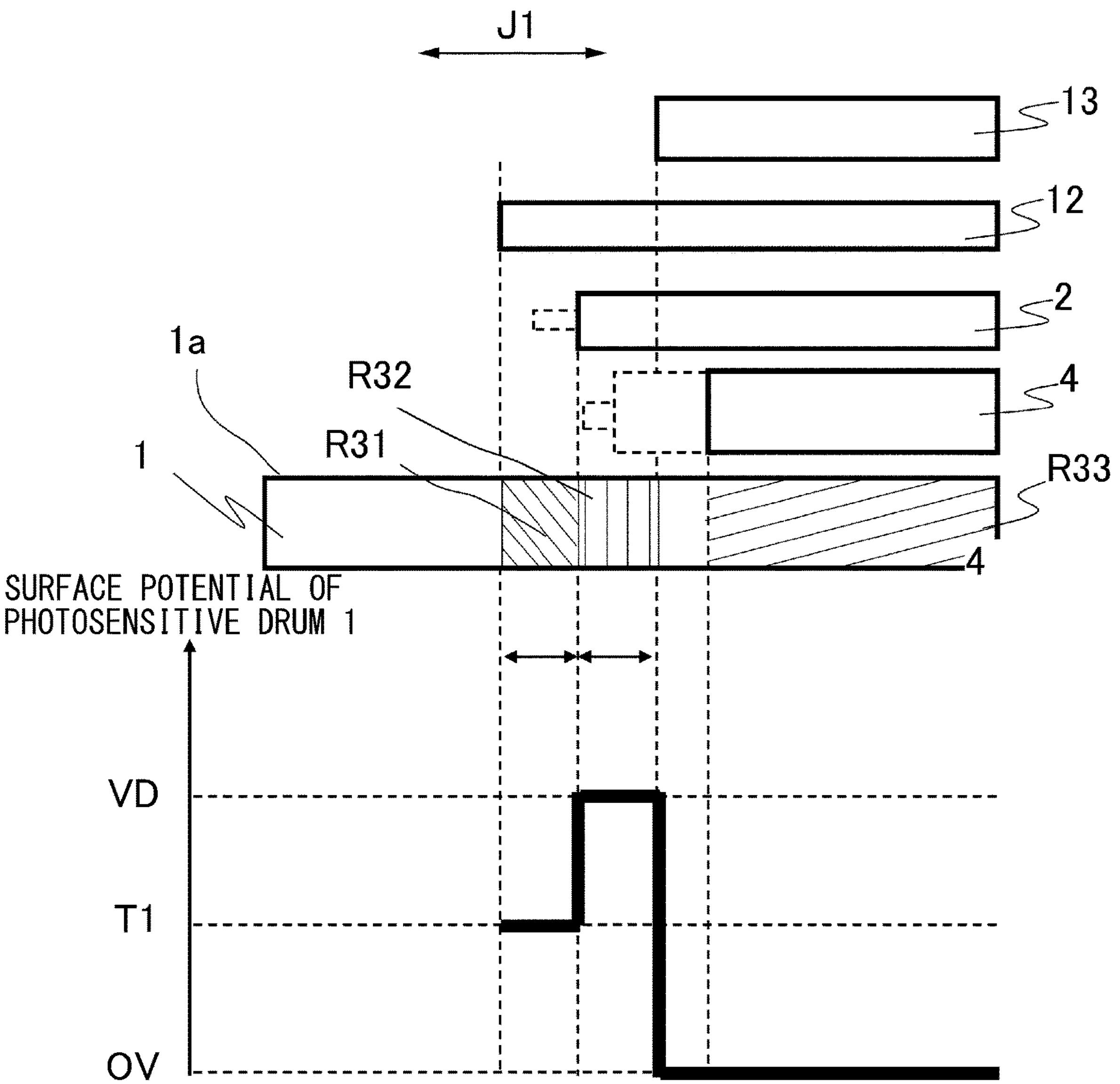
FIG. 10 is a drawing explaining a relation of a surface potential of the photosensitive drum in an area the brush member contacts.

Next, a surface potential of the photosensitive drum 1 in an area the brush member 12 is in contact with will be described with FIG. 10. FIG. 10 is a drawing explaining a relation of the surface potential of the photosensitive drum 1 in the area the brush member 12 contacts. The surface potential of the photosensitive drum 1 described following is the surface potential of the photosensitive drum 1 in the are the brush member 12 is in contact with, unless stated otherwise.

As FIG. 10 showing, the surface potential is 0V without being charged by the charging roller 2 since the area R31 is located outside of the effective charging width B. On the other hand, the surface potential is close to the pre-exposing potential VD in the area of non-exposing portion especially since the area R32 is located inside of the effective charging width B and outside of the contact width F.

Thus, the toner piling on the brush member 12 moves outward in an axial direction J1: i.e., in the direction from the area R32 toward the area R31 as receiving a power of an electric field by a potential difference between the area R31 and the area R32. Therefore, the toner piling on the brush member 12 scatters from an end in the axial direction J1 to inside of the image forming apparatus 100.

For that, the surface potential of the area R31 is configured to be greater than 0V with respect to a predetermined polarity direction to minimize a potential difference between the area R31 and R32 in the present embodiment. Note that, a normal polarity of the area R31 is negative as well as the normal polarity of the pre-exposing potential VD and the toner in the developing container 8.

In the present embodiment an injection charging is executed from the brush member 12 to the photosensitive drum 1 for the surface potential of the area R31 to be a value T1 as a first potential in between 0V and the pre-exposing potential VD as well as the first embodiment. The brush member 12 is applied with the brush charge which is a direct current from the brush charge applying circuit 60 (showing in FIG. 1). The brush charge in the present embodiment is −400V which is the same polarity as the normal polarity of the toner. Therefore, the potential of the brush member 12 becomes high in the negative polarity direction as same as the normal polarity of the toner. As a result, the injection charging by the potential difference between the photosensitive drum 1 and the brush member 12 for the surface potential of the area R31 to become the value T1 (−400V) which is greater in the negative polarity direction in the area R31 of the photosensitive drum 1 where the brush member 12 contacting on.

Note that, the surface potential of the area R33 of the photosensitive drum 1 where the transfer roller 13 is in contact with is close to 0V in the exposing portion and is −150V in the non-exposing portion being affected by the transfer charge. In FIG. 4 the surface potential of the area R33 is shown as 0V as an example of the exposing portion.

Experiment 4

A same experiment made in the first and second embodiments is conducted in the present embodiment as well. Also, as an example to compare effectiveness of the present embodiment, the constitutions of a comparing example 3 showing in a Table 4 is experimented to evaluate toner scattering. The comparing example 3-1 is constituted of several settings of the applying charge of the brush member 12 in a configuration that a relation of the contact width F and the toner coating width E is $E>F$. Also, the comparing example 3-2 is constituted of several settings of the applying charge of the brush member 12 with the opposite polarity in a configuration that a relation of the contact width F and the toner coating width E is $E>F$. The constitutions and experiment results of the embodiment 4, the comparing example 3-1, and 3-2 are showing in the Table 4.

TABLE 4

| | Relation of contact width F and toner coating width E | Brush charge | Toner scattering |
|---|---|---|---|
| Embodiment 4 | $E < F$ | −400 V | O |
| | | −300 V | O |
| | | −200 V | O |
| | | −100 V | O |
| Comparing example 3-1 | $E > F$ | −400 V | Δ |
| | | −300 V | Δ |
| | | −200 V | Δ |
| | | −100 V | Δ |

TABLE 4-continued

| | Relation of contact width F and toner coating width E | Brush charge | Toner scattering |
|---|---|---|---|
| Comparing example 3-2 | E < F | 0 V | Δ |
| | | +100 V | × |
| | | +200 V | × |
| | | +300 V | × |
| | | +400 V | × |

In the constitution of the comparing example 3-1 a toner image formed on the toner coating Width E fails to transfer outside of the contact width F and remains on the photosensitive drum 1 as the transfer remaining toner since the relation of the contact width F and toner coating width E is E>F. This transfer remaining toner comes into and pile up on the brush member 12 as sticking on and rotating with the photosensitive drum 1. As a result, the toner scatters from the end in the axial direction J1 of the brush member 12.

Also, in the constitution of the comparing example 3-2 the area R31 has an opposite polarity of toner since the brush member 12 is applied an opposite polarity charge. Thus, the potential difference between the area R31 and the area R32 becomes greater. As a result, the toner scatters from the end in the axial direction J1 of the brush member 12.

On the other hand, when E<F<A<B<C is satisfied and the injection charging is executed in the constitution of the present embodiment, the potential difference between the area R31 and the area R32 becomes less and the toner scattering can be suppressed.

Note that, in either embodiment described above, the brush member 12 including the base cloth 12*b* and the threads 12*a* collects the adhered materials of the photosensitive drum 1, however, it is not limited. For example, a roller of which an outer peripheral surface of a core metal is formed with a conductive foamed elastic material or a resin brush of which an outer peripheral surface of a core metal is flocked with a conductive nylon fiber of a carbon dispersion type may collect the adhered materials.

Further, in either embodiment described above, the injection charging from the brush member 12 to the photosensitive drum 1 is executed to constitute as the surface potential of the predetermined area (the area R11, R21, R22, and R31) of the photosensitive drum 1 become greater, however, it is not limited. For example, a corona charger charging the surface 1*a* of the photosensitive drum 1 as locating on the downstream of the transfer nip N1 and on the upstream of the brush member 12 in the direction of the arrow L may be provided. In these constitutions the material of the brush member 12 is not necessary to be conductive since the injection charging is not used.

Furthermore, in either embodiment described above, the surface 1*a* is charged by the charging roller 2 in the charging portion N2, however, it is not limited. For example, the corona charger may be used instead of the charging roller 2.

Furthermore, in either embodiment described above, a monochrome image forming apparatus that the image forming apparatus including only one image bearing member was described. However, it is not limited to this, a same control is adapted to a multi-color image forming apparatus forming an image with multiple developer including different toner colors and providing several image bearing members. The multi-color image forming apparatus may use an intermediate transfer method that monochrome images formed on several image bearing members are one-time transferred on the recording sheet after a first transferring on an intermediate transfer member, for example an intermediate transfer belt. Also, a sequentially transfer method a monochrome toner image is transferred one by one on the recording sheet may be adapted. In the other words, a transfer method that the monochrome toner images formed on the several image bearing members are directly transferred on the recording sheet fed by a recording sheet feeding belt may be adapted as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-187882, filed on Nov. 18, 2021, which is hereby incorporated by reference herein in its entirety.

What is claimed is:

1. An image forming apparatus comprising:

a rotatable image bearing member about a rotational axis extending in the axial direction thereof;

a charging member configured to form a charging portion between itself and the image bearing member and to charge a surface of the image bearing member;

an accommodating portion configured to accommodate toner charged to a predetermined polarity;

a developing member configured to form a developing portion between itself and the image bearing member and to form a toner image on the image bearing member by supplying the toner to the image developing portion;

a transfer portion contacting the surface of the image bearing member and configured to transfer the toner image;

an eliminating charge portion configured to eliminate charge on the surface of the image bearing member; and a collecting member configured to collect a deposited matter deposited on the surface of the image bearing member in contact with the surface of the image bearing member, wherein with respect to the axial direction, when A is defined as a eliminating charge width with which the eliminating charge portion is capable of eliminating the charge on the surface, B is defined as an effective charging width with which the charging member is capable of charging the surface, and C is defined as a collection contacting width with which the collecting member contacts the surface, the following formula is satisfied:

$$A<B<C, \text{ and}$$

wherein with respect to the axial direction, a surface potential of the surface in an area outside the effective charging width, inside the collection contacting width and in contact with the collecting member is a first potential larger than 0V in the same polarity direction as the predetermined polarity.

2. The image forming apparatus according to claim 1, wherein a transfer contacting width is defined as a width with which the transfer member contacts the surface with respect to the axial direction, wherein with respect to the axial direction, a surface potential of the surface in an area outside the transfer contacting width, inside the charging width and in contact with the collecting member is a second potential larger than 0V in the same polarity direction as the predetermined polarity, and wherein the first potential is smaller than the second potential.

3. The image forming apparatus according to claim 1, wherein a transfer contacting width is defined as a width with which the transfer member contacts the surface with respect to the axial direction, wherein with respect to the axial direction, a surface potential of the surface in an area outside the transfer contacting width, inside the charging width and in contact with the collecting member is a second potential larger than 0V in the same polarity direction as the predetermined polarity, and wherein the first potential is larger than the second potential.

4. The image forming apparatus according to claim 2, wherein with respect to the axial direction, a surface potential of the surface in an area inside the transfer contacting width and in contact with the collecting member is a third potential, and wherein the third potential is smaller in absolute value than the second potential.

5. The image forming apparatus according to claim 1, wherein a transfer contacting width is defined as a width with which the transfer member contacts the surface with respect to the axial direction, wherein with respect to the axial direction, a surface potential of the surface in an area inside the transfer contacting width and in contact with the collecting member is a third potential, and wherein the third potential is smaller in absolute value than the first potential.

6. The image forming apparatus according to claim 1, wherein in the charging portion the charging member charges the surface of the image bearing member to a fourth polarity in the same polarity direction as the predetermined polarity, and wherein the first potential is smaller in absolute value than the fourth potential.

7. The image forming apparatus according to claim 1, further comprising a voltage applying portion configured to apply a voltage in the same polarity direction as the predetermined polarity to the collecting member.

8. The image forming apparatus according to claim 1, further comprising a corona charger configured to charge the surface of the image bearing member to the first potential.

9. The image forming apparatus according to claim 1, wherein the collecting member includes a brush member has conductivity.

10. The image forming apparatus according to claim 1, wherein the transfer portion transfers the toner imager onto the recording material from the image bearing member.

11. The image forming apparatus according to claim 1, further comprising a belt onto which the toner image is transferred from the image bearing member by the transfer portion and configured to carry the toner.

12. The image forming apparatus according to claim 1, wherein the predetermined polarity is a negative polarity.

* * * * *